(12) United States Patent
Kojima et al.

(10) Patent No.: US 6,311,523 B1
(45) Date of Patent: Nov. 6, 2001

(54) PROCESS FOR FORMING A GLASS SHEET

(75) Inventors: Gen Kojima; Tsutomu Koyama; Akira Takada; Masao Unoki; Kiyoshi Matsumoto, all of Yokohama (JP)

(73) Assignee: Asahi Glass Company Ltd., Tokyo (JP)

( * ) Notice: Subject to any disclaimer, the term of this patent is extended or adjusted under 35 U.S.C. 154(b) by 0 days.

(21) Appl. No.: 09/480,163

(22) Filed: Jan. 10, 2000

Related U.S. Application Data (6362) Continuation of application No. 09/125,794, filed as application No. PCT/JP97/00602 on Feb. 28, 1997, now Pat. No. 6,101,845.

(30) Foreign Application Priority Data

Feb. 29, 1996 (JP) .................................... 8-43486

(51) Int. Cl.⁷ .................................... C03B 35/24
(52) U.S. Cl. .................. 65/25.3; 65/25.1; 65/25.2; 65/66; 65/90; 65/99.1; 65/169; 65/170; 65/182.1; 65/182.2; 65/374.15; 198/626.1; 198/626.5; 198/688.1; 198/691
(58) Field of Search .................. 65/25.1, 25.2, 65/25.3, 66, 90, 99.1, 100, 101, 169, 170, 182.1, 182.2, 374.15; 198/626.1, 626.5, 688.1, 691

(56) References Cited

U.S. PATENT DOCUMENTS

| | | | |
|---|---|---|---|
| 1,579,825 | * | 4/1926 | Le Mare . |
| 2,298,348 | * | 10/1942 | Coxe . |
| 2,844,918 | * | 7/1958 | Van De Walle et al. . |
| 2,878,621 | * | 3/1959 | Zellers, Jr. et al. . |
| 3,083,505 | * | 4/1963 | Wynne . |
| 3,150,948 | * | 9/1964 | Gladieux et al. . |
| 3,186,818 | * | 6/1965 | Havens et al. . |
| 3,749,563 | * | 7/1973 | Stingelin . |
| 3,885,944 | * | 5/1975 | Stingelin . |
| 3,979,196 | * | 9/1976 | Frank et al. . |
| 5,667,547 | * | 9/1997 | Christiansen et al. . |
| 6,101,845 | * | 8/2000 | Kojima et al. . |

* cited by examiner

Primary Examiner—Michael Colaianni
(74) Attorney, Agent, or Firm—Oblon, Spivak, McClelland, Maier & Neustadt, P.C.

(57) ABSTRACT

A process for forming a glass sheet, which is a process for continuously forming a glass sheet, and which comprises a step of introducing a vapor film-forming agent, which is not vapor at least around room temperature and which is vapor at a temperature above the glass transition point of the glass, into a support composed of a structure or a material capable of internally containing liquid, and a step of sliding the support and the glass of which temperature is above the glass transition point against each other via a thin layer of a vaporized vapor film-forming agent.

13 Claims, 1 Drawing Sheet

PROCESS FOR FORMING A GLASS SHEET

This application is a continuation of application Ser. No. 09/125,794 filed Aug. 31, 1998 now U.S. Pat. No. 6,101,845 which is a 371 of PCT/JP97/00602 filed Feb. 28,1997.

TECHNICAL FIELD

The present invention relates to a novel process for forming a glass sheet.

BACKGROUND ART

The presently most widely used process for producing glass sheets, is a so-called tin bath float process wherein prescribed materials are melted in a melting tank, then introduced onto a molten metal tin bath in a reducing atmosphere at a temperature at which the viscosity of glass becomes about 10,000 poise, permitted to spread and move in the longitudinal and transverse directions by means of a mechanical external force and gradually cooled to around the glass transition temperature, to obtain a flat plane glass having a smooth surface. By this process, the smoothness of the product is remarkably improved as compared with the previous roll out process or the like, whereby a polishing step which used to be required, is no longer necessary.

However, this process also has some drawbacks and problems, and improvements are still desired. Namely, in the tin bath float process, a large quantity of tin is used, whereby exhaustion of the tin resource which is not abundant, is feared, it is necessary to maintain the atmosphere to be reducing by means of hydrogen gas in order not to let the metal tin be oxidized, accordingly, applicable fining agent is rather limited, the installation is obliged to be of a large size in view of a problem such as heat balance, whereby the installation investment tends to be large, tin is likely to penetrate into the glass from the surface in contact with the tin, whereby the quality of the product tends to be affected, it is weak against vibration such as earth quake, and it takes time for recovery of the production after an earth quake, and a large quantity of energy is consumed by heating and warming the glass.

Whereas, a production method such as so-called fusion method, has also been proposed, but such a method has not been satisfactory with respect to the surface smoothness of the product or the constant productivity and quality. Further, there has been a proposal such that a gas such as air is supplied from pores on the surface of a support, and molten glass is spread thereon to form a glass sheet (JP-B-50-36445). However, in order to directly and continuously supply the gas as proposed, an enormous quantity of the gas is required. Further, in order to pass it through pores, an extremely high pressure is required, whereby a stabilized control is extremely difficult. Thus, this method is not practical.

The object of the present invention is to solve the various drawbacks in the above mentioned existing processes for forming glass sheets.

DISCLOSURE OF THE INVENTION

The present invention provides a process for forming a glass sheet, which is a process for continuously forming a glass sheet, and which comprises a step of introducing a vapor film-forming agent which is not vapor at least around room temperature and which is vapor at a temperature above the glass transition point of the glass, into a support having a structure or a material capable of internally containing a liquid, and a step of sliding the support and the glass of which temperature is above the glass transition point against each other via a thin layer of the vaporized vapor film-forming agent.

In the present invention, the vapor film-forming agent is vaporized, whereby the vapor is continuously supplied to the interface between the glass and the support. This vapor is present in the form of a thin layer at the interface between the glass and the support. The vapor layer at the interface is renewed by continuous supply of the vapor, whereby there will be no inclusion of impurities to the surface, and a glass sheet having good surface smoothness can be obtained. Further, the vapor film-forming agent is supplied to the support in the form of a liquid, whereby continuous supply is easy, and the amount of supply may be small. The vaporization of the vapor film-forming agent may occur at the forming plane of the support or in the vicinity of the forming plane in the support.

In a preferred embodiment of the present invention, the vapor film-forming agent is introduced into the support while sliding the support and the glass against each other. Further, in another preferred embodiment, the support is repeatedly moved between a state of sliding against the glass and a state of not sliding, while substantially fixing the position of a forming plane defined as a sliding plane between the support and the glass, and the vapor film-forming agent is introduced into the support when it is in the state of not sliding against the glass.

Further, smooth sheet formation is facilitated by spreading the glass by exerting an external force in at least one direction selected from the advancing direction of the glass and a direction perpendicular to the advancing direction of the glass in the sliding plane, if necessary, while sliding the support and the glass against each other.

Further, it is also effective to intermittently slide the glass and the support, as the case requires, to make the glass temperature, etc. to be uniform.

BEST MODE FOR CARRYING OUT THE INVENTION

Embodiments of the present invention will be described with reference to the drawings.

Figure 1:
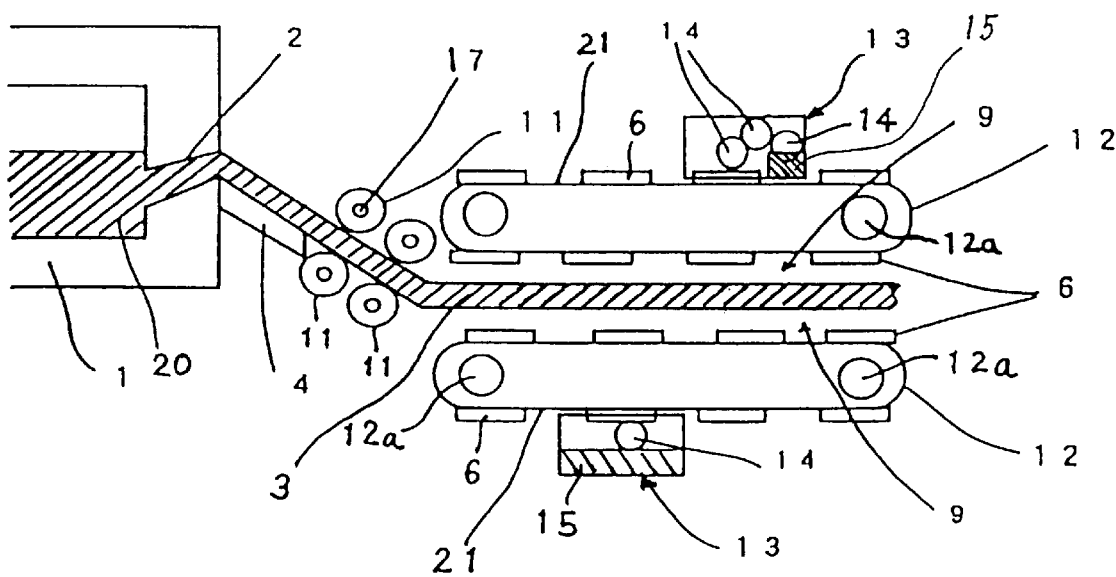
FIG. 1 is a side view illustrating an embodiment of the present invention.

FIG. 1 is a side view illustrating an embodiment of the present invention. Molten glass 20 heated in a glass melting furnace 1 is brought to have a viscosity suitable for forming by controlling the temperature, then permitted to flow down on an inclined plate 4 via an outlet opening 2 and then permitted to pass through a plurality of rolls 11 to form a glass ribbon 3. The rolls 11 have axes in a direction perpendicular to the paper surface. While rotating around the axes, they press the molten glass from the upper and lower directions to form the glass ribbon 3. The glass formed into a ribbon shape is moved onto a belt conveyer 12 in a state where the temperature is maintained to be at least the glass transition point. A plurality of porous hydrophilic carbon plates 6 (supports) having an average pore size of 20 μm are arranged in predetermined distances on the surface of a belt 21 of the belt conveyer 12.

The belt 21 of the belt conveyer 12 is put around a plurality of rolls 12a, and the belt 21 is driven by rotation of the rolls 12a. The advancing speed of the belt 21 is so set that the carbon plates 6 on the belt and the glass ribbon 3 have different moving speeds. Accordingly, the glass ribbon 3 and the carbon plates 6 move relatively (slide against each other).

Into the interior of the carbon plate 6, water (a vapor film-forming agent) is supplied from a supply apparatus 13 at a position of not sliding against the glass. Namely, by rotation of a wet roll 14 disposed to contact a water-filled portion 15 and the carbon plate 6, water filled in the water-filled portion 15 is supplied to the interior of the carbon plate 6 via the wet roll 14. The water supplied to the interior of the carbon plate 6, is vaporized by a heat from the glass ribbon 3 when the carbon plate 6 is in a sliding contact with the glass ribbon 3. Accordingly, steam is continuously generated at the interface between the glass ribbon 3 and the carbon plate 6. Thus, a thin layer 6 of steam is formed at the interface between the glass ribbon 3 and the carbon plate 6.

The glass ribbon 3 advances in a predetermined direction between the belt conveyers 12 having carbon plates 6 disposed on their surfaces, and receives pressure from above and below via the steam during a period until it is withdrawn, whereby the surface smoothness will be improved.

In this embodiment, water was used as the vapor film-forming agent contained in the support. However, without limited to such embodiment, various organic or inorganic substances which are liquid at room temperature, may be used. However, from the viewpoint of the operation efficiency, such as supplying to the support, those having a melting point of at highest 40° C. and a boiling point of from 50 to 500° C., particularly at highest 300° C., under the atmospheric pressure, are preferred. Further, they are preferably stable non-flammable materials which may not be decomposed even at a temperature above 200° C.

Further, the vapor generated by evaporation of the vapor film-forming agent, is preferably one which does not chemically react with the glass so much as to deteriorate the quality of the glass and which has little toxicity and is stable and non-flammable at temperature of the atmosphere used. As a vapor film-forming agent which satisfies such requirements, preferred is one comprising water as the main component as in the above described embodiment.

As the support, a porous hydrophilic carbon plate was used, but the support is not limited thereto. Namely, the support to be used in the present invention may be composed of a material or a structure capable of internally containing a liquid at least in the vicinity of the sliding plane against the glass.

For example, one having a so-called porous structure capable of internally containing a liquid, can be used. Here, the porous structure includes a fiber structure wherein spaces substantially constitute pores. The surface of the porous body has fine pores having a diameter of preferably at largest 5 mm, more preferably at largest 1 mm, most preferably at largest 100 μm. Further, it is preferred that it is made of a material having good affinity to the vapor film-forming agent.

Further, other than a porous structure material, one made of a material capable of internally containing an adequate amount of the vapor film-forming agent as wetted or swollen by the vapor film-forming agent, may be employed. Such a material is capable of absorbing and releasing an adequate amount of the vapor film-forming agent.

Specifically, as the material to be the basis of the support, a polymer material derived from natural substances, such as cellulose, paper, wood or bamboo, and a synthetic polymer material such as thermoplastic resin, thermosetting resin or rubber, or a carbon-type material, may, for example, be used. Further, a metal material such as iron, stainless steel or platinum, a metal oxide such as aluminum oxide, zirconium oxide, silicon carbide or silicon nitride, or a ceramic material comprising a metal carbide or a metal nitride as the main component, may, for example, be also used.

Further, the forming surface of the support may be very smooth except for the above mentioned fine pores or fibrous irregularities, or on the contrary, may have certain constant irregularities The support to be used in the present invention may be processed into a plate shape, a belt shape or a roll shape, or may be installed on a substrate having such a shape, and it forms a sheet glass by sliding against the heated glass via a thin layer of the vapor continuously generated.

The glass ribbon having preliminarily been subjected to rough forming, for example, by passing through rolls, is brought in contact with a thin layer formed by evaporation of the vapor film-forming agent on the surface of the support, while being maintained at a temperature lower than the temperature at which the viscosity shows 100 poise and at least the glass transition temperature, whereby smoothness of the flat surface is increased, and it is subjected to fine modification such as thickness adjustment. During that period, the contact with the vapor layer (sliding against the substrate) may be continuous or intermittent. As a method for intermittently sliding the glass and the support, it is possible to employ either a method of spaciously intermittent sliding by providing a plurality of supports in predetermined distances on a belt, as shown in FIG. 1, or a method of timely intermittent sliding by periodically moving the support to depart from the glass. Further, re-heating may be carried out, as the case requires, during the process.

In sliding the support and the glass, it is important that the glass has a viscosity so that it can form a flat surface and a predetermined thickness by the surface tension of itself and the force from the vapor layer, and a sufficient time is secured.

In order to continuously renew the surface to impart a pressure to the glass, the support moves relatively to the glass. Namely, the support and the glass are in a sliding state. The direction of the movement may be in a parallel direction (inclusive of an opposite direction) or a transverse direction, to the moving direction of the glass. Such may be realized by disposing a support on a belt conveyer and rotating the belt conveyer at a speed different from the moving speed of the glass, as in the above mentioned embodiment, or by vibrating it in a predetermined cycle in a transverse direction to the movement of the glass.

Adjustment of the thickness of the glass can be carried out by various methods. In a case of producing a glass having a thickness close to an equilibrium thickness of the weight and the surface tension of the glass, it can be adjusted by a tensile stress exerted to move the glass ribbon. On the other hand, in a case of producing a glass sufficiently thinner than the equilibrium thickness, it is necessary to carry out an adjustment by exerting a force differently. In the embodiment of FIG. 1, forming is carried out by exerting a pressure via a vapor layer from each side of the glass. The method for exerting the pressure is not limited thereto, and a method may be employed in which a vapor is blown from above. Further, it is possible to accomplish improvement of the smoothness or to control the thickness suitably, by exerting a tension in parallel with the glass surface.

In the present invention, it is possible to spread the glass by exerting a mechanical external force in at least one direction selected from the advancing direction of the glass and a direction perpendicular to the advancing direction of the glass in a sliding plane, while sliding the support and the glass against each other. In this manner, sheeting of the glass can be facilitated.

Further, a support having the vapor film-forming agent of the present invention introduced, can be used also when molten glass is preliminarily roughly formed into a ribbon shape. Namely, when glass is withdrawn down or up in a vertical direction or in an inclined direction from the melting tank, it may be passed through porous rollers or porous plates having the vapor film-forming agent of the present invention introduced, to form it into a ribbon shape.

For example, in the embodiment of FIG. 1, forming rolls 11 may also be made by a porous hydrophilic carbon in the same manner as the carbon plates 6, whereby a glass ribbon having a relatively smooth surface may preliminarily be obtained. In such a case, as shown in FIG. 1, a hole capable of conducting water (vapor film-forming agent) to the interior or around the axis 17 of the roll 11, may be provided, so that water can be supplied through the hole.

The glass is gradually cooled to a temperature of not higher than the glass transition temperature, while sliding against the support. The cooling can be carried out by controlling the temperatures and amounts of the vapor film-forming agent, air, etc. to be supplied, the relative moving speed against the glass, the time, etc. Further, the cooling step can be carried out continuously or intermittently. Then, it is introduced into a lehr or the like and cooled to a temperature near room temperature to obtain a product.

Various types may be employed as the method of introducing the vapor film-forming agent into the support. One method is a method of introducing it into the support at a position where the support is not sliding against the glass, as shown in FIG. 1.

In this case, the support repeatedly moves between a state of sliding against the glass and a state of not sliding. In order to produce a glass sheet continuously, it is preferred that the plane (this is referred to as the forming plane) defining the surface of the glass sheet is substantially spaciously fixed. In the case of the present invention, the forming plane is defined as a sliding plane between the support and the glass. Accordingly, movement of the support is preferably carried out while substantially fixing the spacious position of the sliding plane between the support and the glass.

Figure 2:
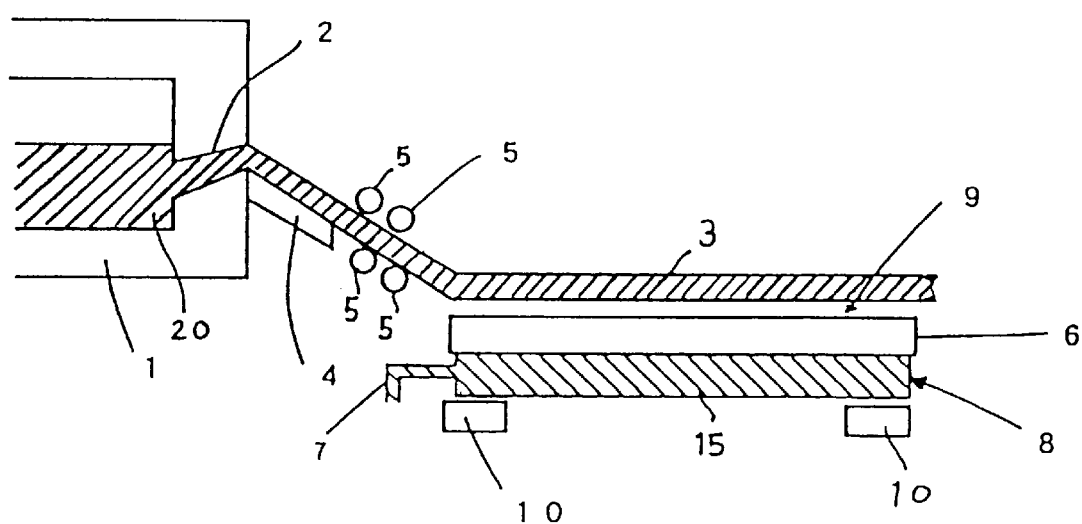
FIG. 2 is a conceptional side view illustrating another embodiment of the present invention.

As another method, for example, a liquid-introducing path is provided on the rear side of the support, and a liquid is passed under atmospheric pressure or elevated pressure to carry out the introduction. Namely, the vapor film-forming agent is introduced into the support while sliding the support and the glass against each other. FIG. 2 illustrates such an example.

In the embodiment shown in FIG. 2, molten glass 20 heated in a glass melting furnace 1 is permitted to flow down on an inclined plate 4 via an outlet opening 2 and then passed through rolls 5 to be formed into a sheet shape. The glass ribbon 3 formed into a ribbon shape is spread on a porous carbon plate 6 having an average pore size of 25 μm in a state where the temperature of the glass is maintained above the glass transition point.

A water-supplying tank 8 having a supplying tube 7 is installed on the rear side of the carbon plate 6, so that water is continuously supplied into the porous plate. The water supplied, is passed through the porous plate and generates steam at the interface with the glass to form a thin layer 9 of steam. The carbon plate 6 and the water-supplying tank 8 are vibrated in a perpendicular direction (in the horizontal plane) to the moving direction of the glass by a driving apparatus 10.

It is important that the supply of the vapor film-forming agent into the support is set depending upon the environmental factors such as the ambient temperature, humidity, etc., in addition to the conditions such as the amount, the type, the thickness, the width, the temperature, etc., of the heated glass to be subjected to forming treatment, as well as other various factors.

All of the above steps and condition settings can be controlled by a computer as the case requires, and it is preferred to do so. For example, it is possible to produce a sheet glass having good quality by optimizing through computer control e.g. the moving speed of the support, the pattern and the moving speed of the glass by detecting the temperature, thickness, smoothness, etc. of the glass being produced and controlling the amount of the generated vapor by the amount, pressure, temperature, etc. of the liquid supplied.

The present invention presents a technique which can be substituted for a tin bath float process which is a typical process for producing a glass sheet now commonly used industrially, and it can be employed for an industrial production of sheet glass for houses, buildings, and shops, glass for vehicles such as automobiles or ships, glass for displays, substrate glass for recording media, glass for decoration, partially crystallized glass, and other flat or curved sheet glass. Further, it is useful also for re-forming sheet glass once obtained.

Industrial Applicability

The process of the present invention has the following advantages.

(1) Tin is not used, for which exhaustion of the resource is worried about.
(2) Sheet glass of high quality can be obtained which is free from inclusion of tin on the surface.
(3) A small size installation can be designed, whereby investment for the installation can be reduced, and various flexible choices are available from small scale production to large scale production.
(4) The energy consumption can be reduced.
(5) No reducing atmosphere is required, and as fining agent, material other than sulfate can be used.
(6) Job change can readily be carried out, and it is easy to produce various types of products.

What is claimed is:

1. A process for forming a glass sheet, comprising the steps of:
   introducing a vapor film-forming agent in a liquid state, which is not vapor at least around room temperature and which is vapor at a temperature above the glass transition point of the glass, from a reservoir into a porous body of a support composed of a structure or a material that internally contains at least the vapor film-forming agent in a liquid state; and
   sliding the glass, which has a temperature above the glass transition point, against the porous body of the support to form a thin layer of a vaporized vapor film forming agent upon which the glass sheet is slid.

2. The process for forming a glass sheet according to claim 1, wherein the glass advances in a certain direction, and wherein said method further comprises the step of moving said support such that the support and the glass slide against each other.

3. The process for forming a glass sheet according to claim 1 or 2, wherein said step of introducing comprises introducing the vapor film-forming agent into the support, while sliding the glass against the support.

4. The process for forming a glass sheet according to claim 1 or 2, wherein said step of sliding comprises repeatedly moving the support between a state of sliding against the glass and a state of not sliding, while substantially fixing the position of a forming plane defined as a sliding plane between the support and the glass, and wherein said step of introducing comprises introducing the vapor film-forming agent into the support when it is in the state of not sliding against the glass.

5. The process for forming a glass sheet according to claim 1, wherein the vapor film-forming agent is water.

6. The process for forming a glass sheet according to claim 1, which is used for forming a glass ribbon.

7. The process for forming a glass sheet according to claim 1, further comprising the step of reheating the glass to a temperature of at least the glass transition point to reform it into a certain shape.

8. The process for forming a glass sheet according to claim 1, further comprising the step of spreading the glass by exerting an external force in at least one direction selected from the advancing direction of the glass and a direction perpendicular to the advancing direction of the glass in the sliding plane, while sliding the support and the glass against each other.

9. The process for forming a glass sheet according to claim 1, wherein said step of sliding comprises intermittently sliding the glass and the support against each other.

10. The process for forming a glass sheet according to claim 1, wherein said step of introducing comprises introducing the vapor film-forming agent in a liquid state, from the reservoir into a porous substrate which forms at least a portion of the support, wherein the thin layer of the vaporized vapor film-forming agent is formed between an upper surface of the porous substrate and the glass.

11. The process for forming a glass sheet according to claim 1, further comprising the step of providing vapor to the glass from a side of the glass opposite to the side of the glass in contact with the thin layer of vaporized vapor film-forming agent.

12. The process for forming a glass sheet according to claim 1, wherein said step of sliding comprises vibrating the support.

13. The process for forming a glass sheet according to claim 1, wherein said step of introducing comprises contacting a roller against the support so as to transfer the vapor film-forming agent into the support.

* * * * *